Sept. 28, 1965  W. A. CROWLEY  3,208,543
AIR CUSHION VEHICLE

Filed July 19, 1961  4 Sheets-Sheet 1

INVENTOR.
WALTER A. CROWLEY
BY
Arthur J. Plantamura
ATTORNEY.

INVENTOR.
WALTER A. CROWLEY.
BY
ATTORNEY.

INVENTOR.
WALTER A. CROWLEY
BY
ATTORNEY.

Sept. 28, 1965  W. A. CROWLEY  3,208,543
AIR CUSHION VEHICLE

Filed July 19, 1961  4 Sheets-Sheet 4

INVENTOR.
WALTER A. CROWLEY
BY
Arthur J. Plantamura
ATTORNEY.

United States Patent Office 3,208,543
Patented Sept. 28, 1965

3,208,543
AIR CUSHION VEHICLE
Walter A. Crowley, Ridgefield, Conn., assignor to American Machine & Foundry Company, a corporation of New Jersey
Filed July 19, 1961, Ser. No. 125,145
16 Claims. (Cl. 180—7)

This invention relates to ground effect machines. More particularly, the invention relates to an air cushion vehicle of improved construction having certain novel features of lift, propulsion and maneuverability.

In general, air cushion vehicles utilize an arrangement whereby a quantity of air is pumped, blown or deflected downward, usually through ducts in the vehicle or through slots around the periphery, or a combination of ducts and slots to form an air layer or cushion to sustain the machine. Sufficient air must be continuously furnished to the supporting air layer or cushion to maintain the pressure and to replace that exhausted from the bottom periphery of the vehicle.

In the past, various means, including the following, have been utilized for thrust and steering of ground effect machines (GEM) or air cushion vehicles (ACV):

(a) In smaller vehicles a shift in the center of gravity may be effected as the operator leans in the direction he wishes to go. In essence, more air is allowed to escape from under the opposite side of the machine than the "forward" side, resulting in a reaction thrust, and in addition, a horizontal component of the tilted duct lift vector is produced. This is usually quite ineffective when traveling over sloping ground or in gusty wind conditions. It also reduces lift and ground clearance.

(b) Some air cushion vehicles have employed movable air vanes and/or rotating slots to deflect the down wash of air in a horizontal direction opposite to the desired direction of translation. This does not give sufficient reaction thrust to obtain good speed or maneuverability, and reduces lift.

(c) Some ACV's have vertical variable slots and/or vanes to control the direction of air which is permitted to blow horizontally out of a common chamber from which air for both lift and thrust is obtained (the "integrated system"). This has the disadvantage that the air volume and pressure available for lift is appreciably reduced when the steering and thrust jets are opened wide, so that the ACV loses altitude. Secondly, the air pressure and volume available for thrust and steering is usually quite inadequate for good maneuverability.

(d) Some ACV's use tilting ducts in close proximity to the ground to produce horizontal thrust components for translation and steering. This reduces ground clearance on the low side of the ducts and produces the thrust at the expense of lift.

(e) Horizontal intake for lift air has been used for some ACV's to obtain thrust, with air foils on the outside of the machine for steering. Thrust is obtained by sacrificing the lift which would have been obtained by a vertically directed intake but probably with reduction in drag. However, external air foils are ineffective while hovering and during low speed translation so that other means must be employed for steering. Secondly, unless the ducts can be swivelled or baffled in some way to neutralize their thrust, it is not possible to hover at all. Thirdly, it is necessary to "crab" sideways in a cross-wind to maintain a course.

(f) Some ACV's have used externally mounted propellers, shrouded or unshrouded, designed to swivel, or with air foils to deflect the air, for steering. Separate means to obtain lift air is employed. The externally mounted propellers obscure vision of the operator and passengers and constitute a hazard. A further disadvantage in some cases is that the thrust vector is too high above the center of pressure and center of gravity for proper control, so that excessive pitching or rolling movement is obtained during maneuvers.

The disadvantages in the above systems are overcome by the present invention wherein a dual pressure system comprising a source of air, of relatively low pressure, for lift is used in conjunction with a separate source of air, at a relatively higher pressure, for thrust and maneuverability of the vehicle.

The system of the invention has the further important advantage of keeping the dust and spray recirculation to a minimum. One embodiment of the invention comprises a low pressure air generating fan blowing large volumes of low pressure air into an open plenum chamber which is used for lift; a second high pressure air generating ducted fan system will be used to supply higher pressure air to provide thrust and steering system. The high pressure generating ducted fan(s) will blow into a closed chamber from which the air will be controllably expelled through suitable vents to produce substantially horizontal thrust from selected parts of the vertical periphery of the ground effect machine. In general, vents are positioned at the side for steering or side thrust and at the rear or front for forward or braking thrust, although vents positioned at the corners of the rectangular vehicle may suitably be employed.

It is an object of the present invention to provide an improved air cushion vehicle of novel and efficient design.

It is a further object of the invention to provide an air cushion vehicle characterized by a dual pressure air system in which air is supplied at one pressure for lift and a separate source of air at a relatively higher pressure is utilized for thrust and maneuverability.

It is a further and more specific object of the invention to provide an air cushion vehicle utilizing a dual pressure system in which a portion of primary, relatively high pressure, air is utilized directly to provide thrust and maneuverablity and a portion is utilized to drive a turbine tipped fan to produce relatively low pressure air for the lifting plenum.

Other objects and advantages will become apparent from the accompanying description when considered in conjunction with the accompanying drawings wherein.

Figure 1:
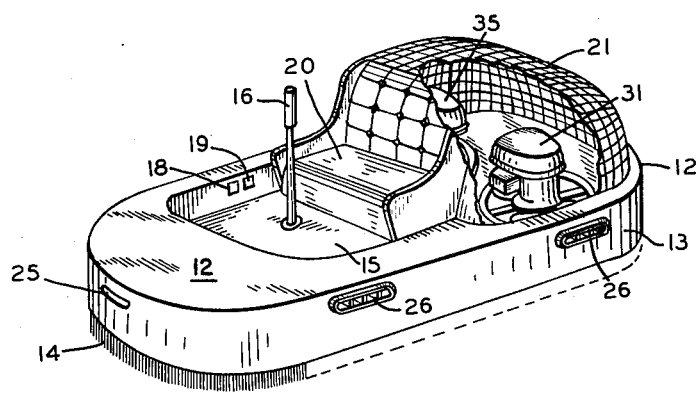
FIG. 1 is a perspective view of one embodiment of the invention illustrating a relatively small vehicle utilizing separate air sources for lift and for maneuverability.

The invention is broadly concerned with, and has as its primary feature, the utilization of air under two different pressures to drive an air cushion vehicle. Although the invention is applicable to air cushion vehicles utilizing the principle of annular jet (or slot) wherein a jet of air is expelled around the bottom periphery of the vehicle, the invention will be described primarily in conjunction with air cushion vehicles utilizing the open plenum chamber principle as the main lifting agency. The use of an annular jet to augment the lift obtained by the open plenum chamber is also within the contemplation of the present invention. In the description which follows the term "ground effect machine" (GEM) is employed in a sense which is synonymous with air cushion vehicle (ACV).

In the past, where there have been attempts to employ a single source of low pressure air for both lift and horizontal thrust as in a plenum type vehicle, or annular slot GEM, it has generally been found that the air lacks sufficient pressure (and mass flow) to give good steering response or thrust for starting, stopping and the side forces needed for turns and to counter cross-winds, because of the severe demand on the air supply for lift. Also, there is the problem of losing altitude, due to loss of supporting air, when thrust or steering "jets" are opened wide.

If high pressure air is used, as in a narrow slot (annular jet) GEM as where a conventional single pressure system is employed, there may be sufficient pressure and possibly sufficient mass flow for quick steering response and thrust for starting and stopping, if the jets are large enough, and if a sufficiently powerful air supply system is employed. In such arrangements, there is still the problem of loss of altitude due to pressure reduction when the steering and thrust jets are wide open. Moreover, another serious problem is introduced: the high pressure annular jet used for creating the supporting air pressure has a high exhaust velocity and this high velocity jet blasts into the dirt or water beneath the GEM causing a cloud of dust or spray to recirculate. This recirculating dust or spray obscures vision of the operator, causes distress to nearby spectators, and tends to erode the fans and propellers.

In accordance with the invention, good performance is obtained by use of separate means, i.e. a separate air system for lift that has a low pressure, low velocity flow which does not cause excessive spray or dust recirculation, and a second air system for maneuvering and propulsion so that operation of thrust and steering does not result in reduction of lift. The maneuvering facility is such that in addition to propulsion, it provides adequate side thrust, when needed, to counter cross-winds, gusts and effect of uneven terrain, for example. Most important, it is capable of providing centripetal force for turning maneuvers and adequate thrust for acceleration and deceleration. Optionally, air from the system employed for maneuvering may be fed in part or in total to augment the lift for special situations where maximum hover height is required. This may be accomplished by an air feed into the open plenum chamber consisting of an annular slot or by means of suitable ducts having valved closures.

In all air cushion vehicles, it is important that the supporting air pressure be reduced to a minimum and that the exhaust velocity of the air escaping from under the GEM be as low as possible; this reduces the dust and spray recirculation problem and reduces the losses due to back pressure on the ducted fan. The desired effect is accomplished best by low area loading and by two or more ducted fans blowing straight down into an open plenum chamber. With this arrangement, the mass flow of air through the ducts generate direct lifting thrust, as in a ducted fan helicopter, which substantially reduces the pressure required in the plenum and increases the operating altitude of the GEM. A symmetrical arrangement, such as ducted fans placed in the four corners of a rectangular GEM, in which two clockwise and two counterclockwise rotating ducted fans may be used so as to have no torque reaction on the GEM. This further permits pitch and roll control for higher altitude operation by speeding up one pair of fans with respect to the opposite pair. Axial flow ducted fans blowing into an open plenum chamber can operate at any reasonable altitude, both in and above ground effect, whereas the lift of annular jets falls off rapidly with increased altitude. A single control stick may operate, as in a conventional aircraft, to control pitch and roll. Some methods which may be employed are those utilizing a single piston engine which drives hydraulic pumps or air compressors or a gas turbine which drives turbine tip fans or hydraulic pumps. The output of the pumps or air compressor goes into a single manifold from which the hydraulic oil or compressed air flows to each of the four lifting ducts where the hydraulic oil or compressed air drives hydraulic or compressed air motors which drive the fans. A single lever (control stick) varies the flow in such a manner that any combination of pitch and/or roll movement may be obtained. With a ducted fan system of ample power, it is possible to have a GEM with "jump capability"—that is, a GEM which can rise, like a ducted-fan helicopter, out of ground effect to clear obstacles and still maintain altitude control.

I have found that when the forward velocity of a GEM or ACV is quite high, approaching the velocity of the air escaping from under it—and at lower speeds when operating at maximum altitude—the vehicle tends to pitch nose up and may even flip over on its back. This has been explained as induced air drag above the center of the GEM, due to air being drawn through the ducted fan inlets, and by ram air moving the center of pressure forward under the vehicle. ACV performance which is free of this defect may be obtained by designing the vehicle as a delta wing GETOL (GEM designed to take off and land on ground effect, but capable of flying out of ground effect using air foils for lift and control singly or in conjunction with the ducted fan lift). It is important in vehicles designed for such performance that the center of the lift of the duct(s) act through or near the center of gravity of the model and the center of the air foil lift, and further that the horizontal thrust vector operate through a point through which the combined air foil and induced air drag of the ducted fans operates. Such a model has pitch stability at any speed, both in and out of ground effect.

Figure 2:
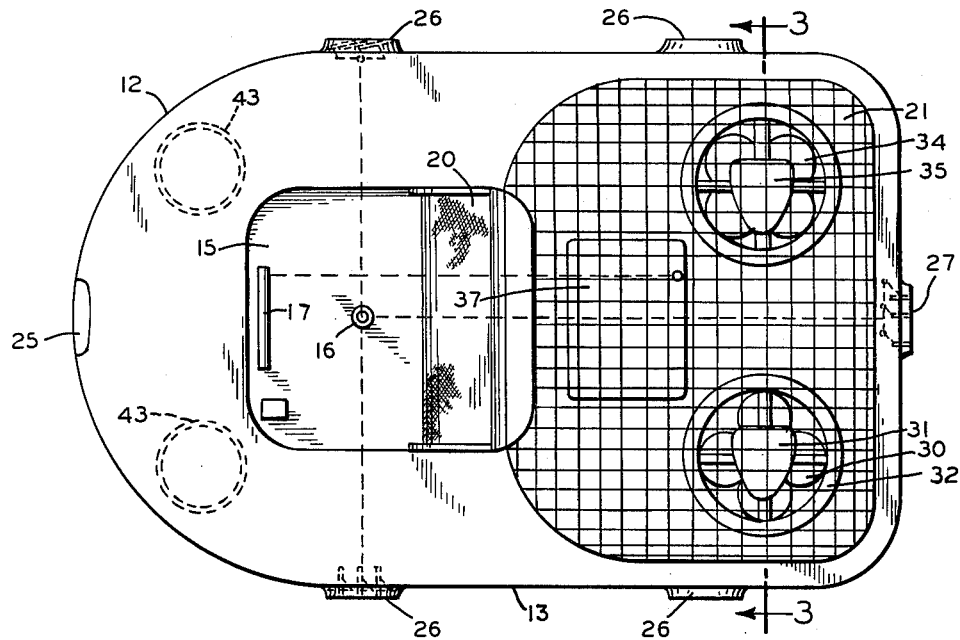
FIG. 2 is a plan view of the vehicle illustrated in FIG. 1 showing the general arrangement of the lift and thrust motors and fans and the passenger compartment.
Figure 3:
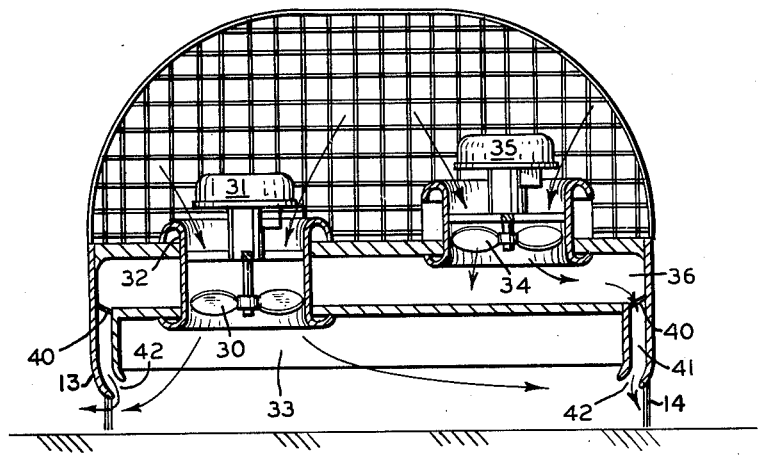
FIG. 3 is an end elevational view taken substantially along line 3—3 of FIG. 2.

Having generally described the nature of the invention, the novel features which I claim as my invention will now be described in greater detail in conjunction with the drawing. In FIGS. 1–3 of the drawing, an air cushion vehicle is illustrated as having a platform portion 12 and an upstanding vertical portion 13 surrounded optionally at the bottom periphery by a flexible fringe or skirt 14. The skirt may comprise a bristle material and/or flexible skirt of a material such as plastic or fiber. Arranged in the flat portion is a well 15 for the crew or operator in which is situated a control stick 16, foot throttle 17, switch buttons 18 and 19 and a seat 20. Formed at the rear of the seat is a screened enclosure 21 within which is enclosed the air generating fans and motor or other driving means therefor. Vents 25, 26 and 27 are used to maneuver and provide thrust for the vehicle. Although a single vent is illustrated at the front and rear of the vehicle, it will be apparent that two or more may be suitably used. For example, an additional vent at each of rear corners may be selectively controlled to aid forward thrust and turning movements.

Referring more particularly to FIGS. 2 and 3, it is seen that fan 30 driven by a motor 31, suitably mounted in a duct 32 having a bellmouth suitably formed at each end, is employed to force air into an open plenum chamber 33 at the base of the vehicle. The air generated by the fan 30 comprises the main lifting medium of the vehicle. A second fan 34 driven by motor 35 generates air for the chamber 36 at a pressure relatively higher than the air generated in the plenum chamber 33. The higher pressure air of chamber 36 is employed to propel and maneuver the vehicle by expulsion through the vents 27 and 26, respectively. A fuel container 37 supplies fuel to the motors 31 and 35. Side vents 26 are employed not only to make turns but to counter cross-winds that might prevail while the vehicle is underway. The high pressure air in the chamber 36 may also optionally be exhausted through the vent 25 to provide a braking means by a reverse thrust. A portion of the air generated in the plenum chamber 36 may be controllably exhausted as by control means 40b through a suitable valving means 40 (hinged at 40a) which functions to open and close an opening in the form of an annular jet 42 (see FIG. 3) close to the outer periphery of the open plenum chamber 33 to augment the lift. When so employed, the annular slot 42 is directed to blow an air jet preferably at an angle toward the center of the plenum chamber. An angle of from 30° to 60° from vertical is useful. The higher angles give more "lift" but produce instability. The resulting effect of the annular jet lift when combined with the lift from the low pressure open plenum chamber is to provide a very substantial additional altitude to the vehicle which exceeds the sum of the lift obtained by each of the sources of lift individually. In appropriate circumstances, when underway, or for maximum hovering height, each of the side and rear vents may be closed and the entire amount of air generated in the high pressure plenum chamber 36 may be exhausted through the annular slot 41 for the purpose of surmounting unusually large objects on the surface terrain. The introduction of high pressure air from the closed plenum chamber to the open plenum chamber to provide additional lift may also be effected through passages 43 which are of a suitable size and are arranged to be opened as by butterfly valves 43a pivotable at 43b by appropriate controls 43c and may be co-ordinated with air released through the annular slot 41.

Figure 4:
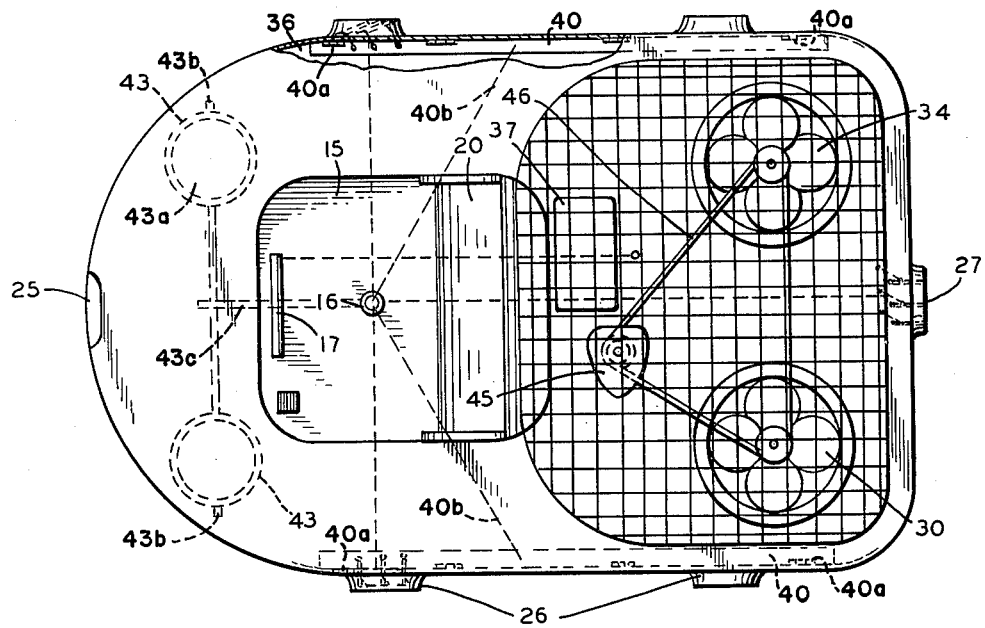
FIG. 4 is a view comparable to FIG. 2 in which a modified vehicle wherein a single motor is utilized to drive both high and low pressure air supply fan blades.

In the embodiment shown in FIG. 4, a single motor 45 is utilized to drive the air generating fans 30 and 34 through a suitable drive 46. Where it is desired to drive the fans 30 and 34 at differential speeds, a suitable gear reduction system (not shown) or other means known in the art may be employed to drive one of the propellers at a differential speed with respect to the other.

Figure 5:
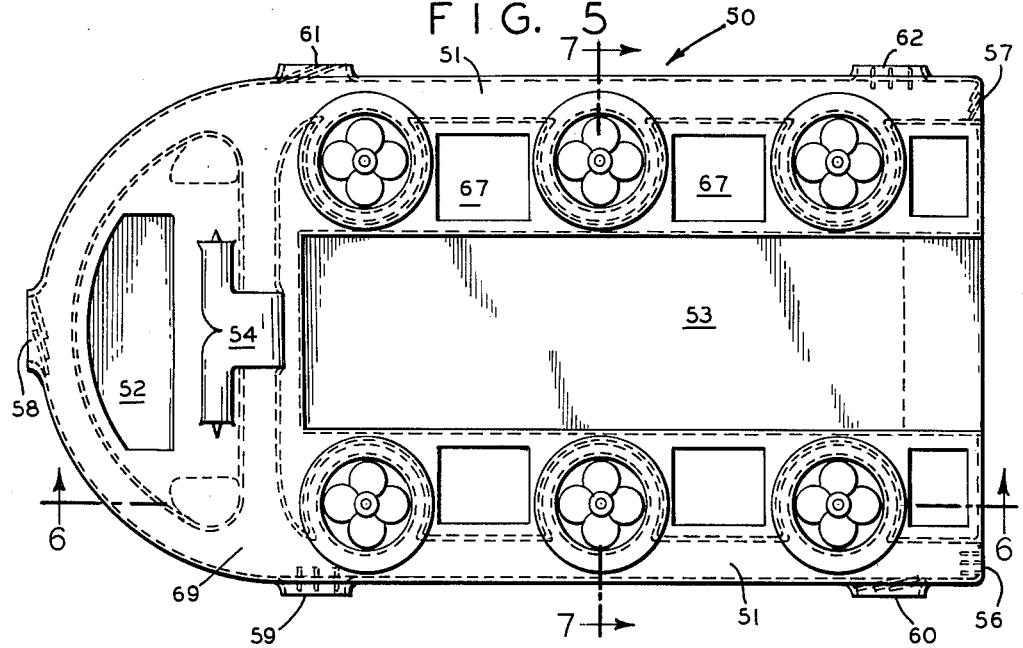
FIG. 5 is a plan view of another modification illustrating a larger vehicle in which the air source is derived from a single unit and utilized in part to propel a plurality of vehicle lift air fans.
Figure 6:
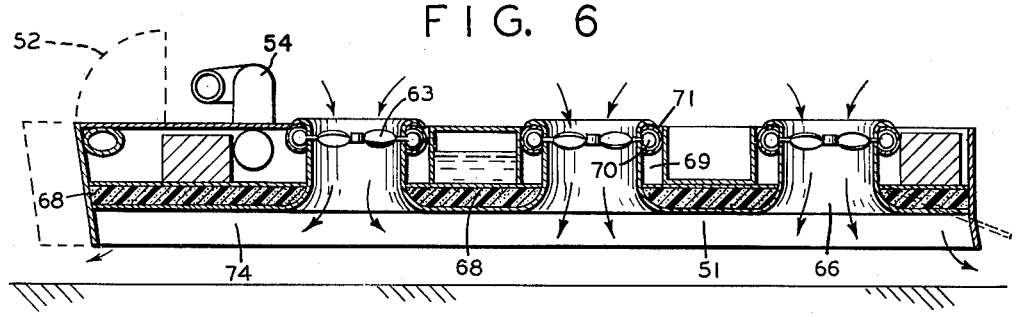
FIG. 6 is a side elevational view of the vehicle taken substantially along the line 6—6 of FIG. 5.
Figure 7:
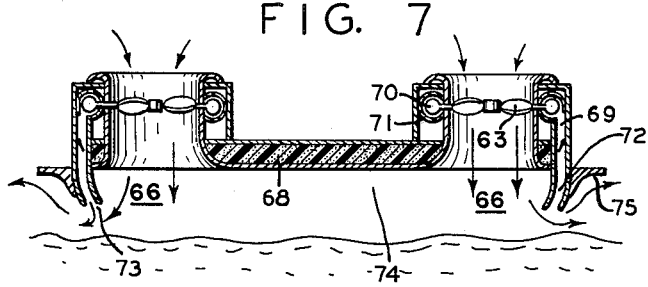
FIG. 7 is an end elevational view of the vehicle taken substantially along the line 7—7 of FIG. 5.

In the embodiment illustrated in FIGS. 5–7, a larger vehicle 50 having a barge-like configuration is illustrated. It comprises generally a hull 51, a control center or cabin 52, and a central cargo space 53. Suitably located, as conveniently illustrated, behind the control cabin 52 is an appropriate source of air generation. For this purpose, one or more gas turbines of the type commercially available may be used advantageously. The arrangement shown at 54 comprises a pair of high pressure air generating gas turbines such that the machine may be operated by both turbines or by each one independently. Arrangements other than gas turbines as hereinabove referred to may suitably be employed. Gas turbines of suitable capacity for the desired air supply capabilities are commercially available. As such, for example, are the Avco/Lycoming T53 gas turbines, the General Electric Co. gas turbines, for example, model G.E.–J85 disclosed in "Transactions of the American Society of Mechanical Engineers," vol. 81, New York, 1959, pages 268 and 272, and Bristol-Siddeley BS–53 turbofans. Separate gas turbines may be employed for the open plenum and for the closed plenum chambers. Advantageously, a gas turbine which generates high pressure air may be employed so that the air generated is apportioned. As such, a quantity of the high pressure air produced is vented through the various louvered fins which include a pair of rear thrust vents 56 and 57, a front braking or reverse thrust vent 58, a forward port vent 59, an aft port vent 60, a forward starboard vent 61 and an aft starboard vent 62. Another portion, and generally as the vehicle first gets underway a major proportion of the high pressure air generated by the turbine 54, is employed to propel or drive a plurality of turbine tip fans 63 to provide low or secondary pressure, high volume air for the lower pressure plenum chamber 66 functioning as the main lift medium for the vehicle. As the vehicle attains fairly high speed, ram air entering the open plenum chamber by any convenient arrangement, such as louvers or air scoops in the forward skirt area, shown for example as item 98 in FIG. 9, may be utilized to provide substantial quantities of the air for lift. Suitable turbine tip fans which may be used to convert the high pressure air generated by the turbine to low pressure high volume air are those manufactured by the General Electric Co., for example, G.E. model X353–5, lift fan.

As shown more clearly in FIGS. 6 and 7, high pressure air from the turbine 54 pumped into the space 69 is employed through turbine nozzles (not shown) to propel the fan turbine buckets 70 contained within the fan shroud 71.

As described hereinbefore, a portion of the high pressure air may be vented through an annular passage 72 to form an annular jet of air at 73 to act as an air curtain and reduce the rate of loss of air from the open plenum chamber 74. It will be apparent that in addition to gas turbines, other drive means for the fans 63 may be utilized to generate relatively high and low pressure air in lieu of that furnished by the gas turbine and fan combination described hereinabove. The space 67 may be utilized as fuel containers and/or as ballast tanks or as storage for special equipment needed in the operation or servicing of the vehicle. Suitably incorporated in the structure of the vehicle in appropriate spaces may be buoyant material such as plastic foam 68 of suitable thickness to provide adequate buoyancy. Illustrated at 75 are spray and dust deflectors or suppressors as an aid in directing spray or dust which may arise away from the vehicle.

Figure 8:
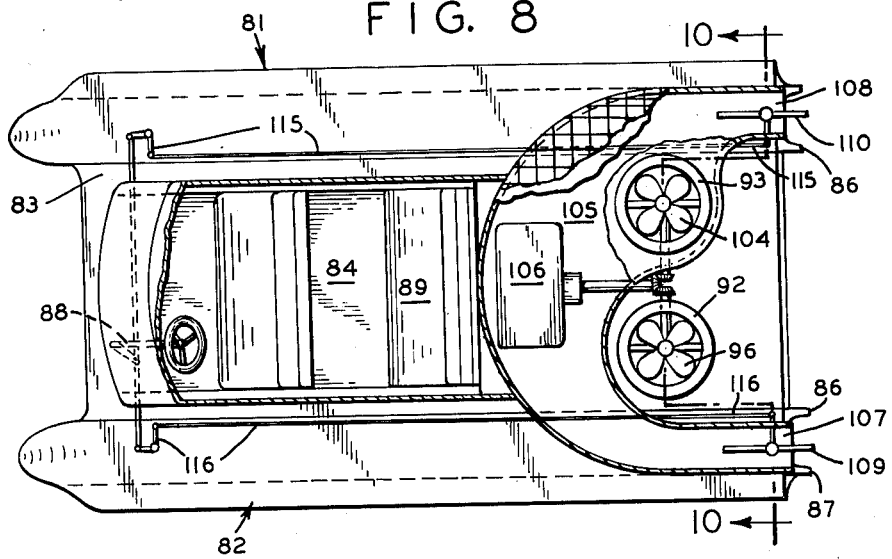
FIG. 8 is a plan view of a further modification illustrating a catamaran type air cushion vehicle utilizing, in accordance with the invention, one source of air for lift and a second source to provide thrust.
Figure 9:
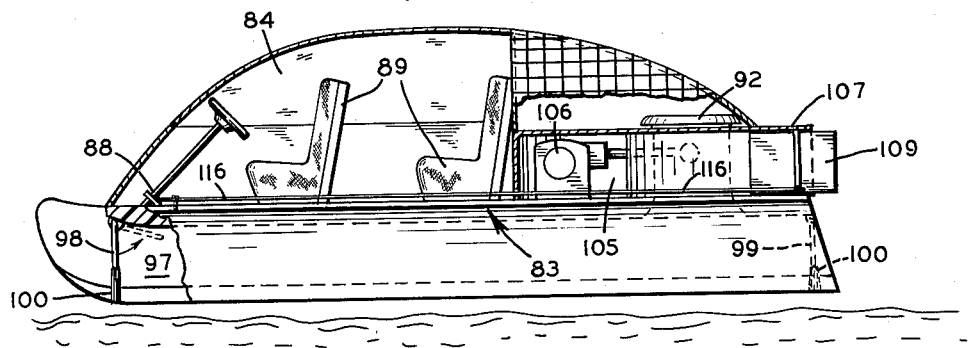
FIG. 9 is a side elevational view of the vehicle shown in FIG. 8 with sections partially cut away to show more clearly the elements of construction.
Figure 10:
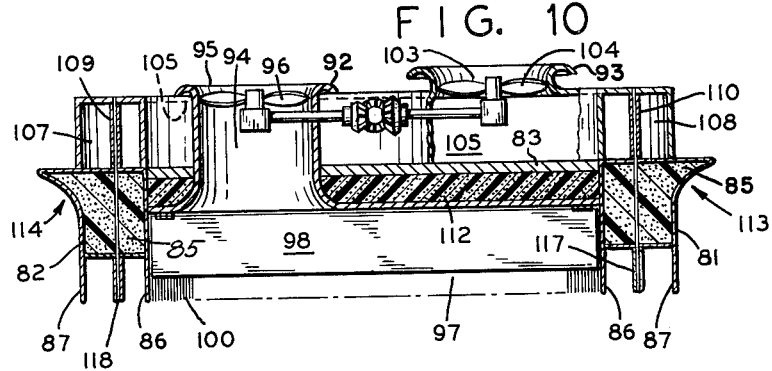
FIG. 10 is an end elevational view of the catamaran vehicle taken substantially along the lines 10—10 of FIG. 8.

Referring to the embodiment of FIGS. 8–10, a catamaran-type vehicle comprising a general arrangement of two longitudinal pontoon-shaped side elements or skegs 81 and 82, which may be partially submerged in the water to partially support the vehicle (to enable the ACV to operate at low speed with reduced fuel consumption— like a side—skeg ACV. The vehicle is designed so that these are lifted (by the plenum air pressure) clear of the water for high speed, fully air cushion, operation). The pontoons are joined by a buoyant flat deck segment 83. The pontoon-like skegs have curved outboard sides 113 and 114 to deflect the spray from the ACV and hence reduce recirculation of water mist. Suitably located on the deck portion 83 is a passenger cockpit and control center 84. The pontoon skegs 81 and 82 comprise elements extending the length of the vehicle preferably formed of rigid durable material, such as aluminum or fiber glass, and may be air tight or the interior 85 of which is filled with buoyant material such as plastic foam. Optionally, a portion of the spaces 85 may be employed as fuel containers or storage for special equipment.

Formed at the bottom of the longitudinal members 81 and 82 are double inner and outer skeg blades 86 and 87, respectively, which knife through the water when the vehicle is only partially elevated. These are designed to break up laminar air cross-flow (which would create "suction" under the pontoon) and also to reduce the velocity of the air escaping from under the ACV (by inducing turbulence). These vertical edges also aid in reducing side slip when making turns (see FIG. 10). As shown, the skeg blades 86 and 87 are formed integrally with the pontoons and curved outboard sides 113 and 114, although any suitable means of construction may be used.

The passenger cockpit contains a conventional steering mechanism 88 and starter switch and other conventional auxiliary navigation or safety equipment not shown. Suitable seats 89 for passengers are provided.

The lift and propulsion system for the vehicle illustrated in FIGS. 8-10 may be analogous to that described in conjunction with FIG. 4 comprising a lift ducted fan arrangement 92 forcing air into the open plenum chamber 97 and a thrust ducted fan unit 93 which generates the relatively higher velocity air into the closed chamber 105 for thrust. The lift fan arrangement comprises a duct 94 terminating at the top of a bellmouth 95. A suitable fan 96 is mounted in the duct to force air down into a plenum chamber 97 at the bottom of the vehicle. The air is confined by the skegs 86 at the sides and by flapper arrangements 98 and 99 at the front and rear, respectively. The flappers are arranged to tilt or fold to the rear up against the deck 83. Appended to the flappers 98 and 99, so as to extend to a level of about the bottom of the skegs 86, are flexible fringe portions 100. Flappers 98 and 99 are arranged so that, as the vehicle sits in the water or when the vehicle is underway, waves impacting the front of the machine freely move these elements rearward. The flappers 98 and 99 are spring loaded so as to return to their normal substantially vertical position. The flexible fringe depending from the elements 98 and 99 assist in confining to a maximum, the air source and thereby to provide the greatest lift with the expulsion of the least quantity of air.

The thrust duct arrangement 93 comprises a duct 103 in which is mounted a fan 104 preferably driven at a higher speed so as to provide air at a relatively higher pressure in the chamber 105. Suitable driving means, preferably a single engine 106 such as a General Motors Corvair Engine, as described in the "1960 Chevrolet Corvair Shop Manual" Chevrolet Motor Division, General Motors Corporation, Detroit, Michigan, 1959, is employed to drive both fans 96 and 104 at suitable differential speeds. A conventional connecting arrangement between motor and fans such as belt or gearing may be employed. The air used to cool the engine would also be ducted (by suitable means not shown) to provide a portion of the lift or thrust. To provide thrust for the vehicle, air generated by the fan 104 and passing into the closed air chamber 105 is then expelled at the rear through the ducts 107 and 108. Suitably positioned in these ducts so as to provide steering are air foil rudders 109 and 110 connected by conventional link and crank arrangement (shown as 115 and 116 in FIG. 8) to the control mechanism 88 in the cabin 84.

The flat deck portion 83 of the vehicle is preferably formed so as to comprise a buoyant layer 112 formed in appropriate thickness of a material such as plastic foam. The deck portion may be rigid but optionally need not be of excessive strength in view of the fact that the vehicle, when not underway, sits in the water so that the deck portion is in contact and supports the load placed on the deck. As the lift fan is operated, air is blown into the chamber 97 lifting the vehicle and affording support to the deck 83 so that at all times the deck is supported either by air or by water.

In operation, the lift fan is started and the vehicle is raised so that at the start of the lift only the lower portion of the pontoons and, subsequently, only the blade portions 86 and 87 remain in the water. When only blades 86 and 87 are immersed, the steering provided by air rudders 109 and 110 may be supplemented by water rudders 117 and 118. Rudders 117 and 118 are mounted on extensions of the same shafts as air rudders 109 and 110. As the vehicle gains speed by the expulsion of air generated by the thrust fan 104 through the ducts 107 and 108, ram air forces back the front flapper 98, thereby aiding in the lift of the vehicle. It has been found that air expelled from beneath the vehicle across a double blade arrangement such as shown at 86 and 87 effects a more desirable barrier to the escape of air than occurs if only a single blade 86 or 87 is utilized. Maneuverability is effected by controlling the rudders 109 and 110 through linkages 115 and 116. As ram air is forced beneath the vehicle by increased speed, less air need be generated by the lift fan 94 or alternately for a given volume of air generated by the fan 94, a higher elevation of the vehicle is attained. It will be apparent, however, that the vehicle of FIGS. 8-10 may also operate clear of the water at lower speeds by using more power for the lift fan. It will be apparent, further, that a commercially available outboard motor of suitable size may be appropriately affixed to the vehicle to permit propulsion in the water as a conventional boat when the air system is not in use.

Although a limited number of embodiments and details are presented herein, it will be understood that various additional modifications apparent to one skilled in the art may be made in the invention without departing from the scope of the invention. Accordingly, the invention is not to be limited except insofar as necessitated by the appended claims.

I claim:

1. An air cushion vehicle utilizing essentially a dual pressure air system comprising a base, an open plenum chamber functioning as the main vehicle lifting medium formed at the underside of said base, a second substantially enclosed plenum chamber in said vehicle positioned over said open plenum chamber, air outlets in said enclosed chamber arranged to expel air in a direction substantially transverse to the lift direction to provide steerage and thrust for said vehicle, a first air generating source for the open plenum chamber, and a second air generating source providing air of a relatively higher pressure for said closed plenum chamber.

2. An air cushion vehicle utilizing essentially a dual pressure air system comprising a base, an open plenum chamber functioning as the main vehicle lifting medium formed at the underside of said base, a second substantially enclosed plenum chamber in said vehicle positioned over said open plenum chamber, air outlets in said enclosed chamber arranged to controllably expel air in a direction substantially transverse to the lift direction to maneuver said vehicle, a valved air passage directing air from said enclosed chamber into said open plenum chamber to augment the function of said open plenum chamber, a first air generating source for the open plenum chamber, a second air generating source providing air at a relatively higher pressure and means for controlling the flow of air through said air outlets and air passage.

3. An air cushion vehicle according to claim 2 containing regulating means for passage of air from said enclosed plenum chamber to the open plenum chamber to augment the lifting function of said open plenum chamber.

4. An air cushion vehicle utilizing essentially a dual pressure air system comprising an open plenum chamber functioning as the main lifting medium for the vehicle, a second substantially enclosed plenum chamber in said vehicle positioned over said open plenum chamber, air outlets in said enclosed chamber arranged to controllably expel air in a direction substantially transverse to the lift direction to maneuver said vehicle, a valved air passage directing air from said enclosed chamber into said open plenum chamber to augment the function of said open plenum chamber, a first air generating source for the open plenum chamber, a second air generating source providing air of a relatively higher pressure for said closed plenum chamber and means for controlling the flow of air through said air outlets and air passage.

5. An air cushion vehicle utilizing essentially a dual pressure air system comprising an open plenum chamber functioning as the main lifting medium for the vehicle, a second substantially enclosed plenum chamber in said vehicle positioned over said open plenum chamber, air exhaust outlets in said enclosed plenum chamber arranged to controllably expel air in a direction transverse to the lift direction to maneuver said vehicle, a valved air passage substantially at the periphery of said open plenum chamber leading from substantially enclosed plenum chamber to augment the lifting function of said open plenum chamber, a first air generating source for the open plenum chamber, a second air generating source providing air of a relatively higher pressure for said closed plenum chamber and means for controlling the flow of air through said air outlets and air passage.

6. An air cushion vehicle utilizing essentially a dual pressure air system comprising an open plenum chamber functioning as the main lifting medium for the vehicle, air exhaust outlets on said vehicle to controllably expel relatively high pressure air in a direction substantially transverse to the lift direction to maneuver said vehicle, an air ventable passage substantially at the periphery of, and exhausting into, said open plenum chamber, air propelled secondary air generators providing a source of relatively low pressure air for said open plenum chamber, and a relatively high pressure primary air generating source providinng air to said air exhaust outlets, to said passage exhausting into the open plenum chamber and to propel said secondary air generators.

7. An air cushion vehicle utilizing essentially a dual pressure air system comprising an open plenum chamber functioning as the main lifting medium for the vehicle, a second substantially enclosed plenum chamber in said vehicle positioned over said open plenum chamber, air outlets in said enclosed chamber arranged to controllably expel air in a direction substantially transverse to the lift direction to maneuver said vehicle, a valved air passage exhausting air from said enclosed chamber into said open plenum chamber, control means to optionally exhaust the whole supply of air from said enclosed chamber through said passage into said open plenum chamber, a first air generating source for the open plenum chamber, a second air generating source providing air at a relatively higher pressure for said closed plenum chamber and means for controlling the flow of air through said air outlets.

8. An air cushion vehicle in accordance with claim 2 in which a gas turbine is used directly as the air generating source for the closed plenum chamber and additionally to furnish motive power for the air generating source for the open plenum chamber.

9. An air cushion vehicle in accordance with claim 1 in which a separate motor and air generating fan is employed as the source of air for the open plenum chamber and a second motor and air generating fan is employed as the air source for the closed plenum chamber.

10. An air cushion vehicle in accordance with claim 1 wherein a single motor is employed to drive a first fan generating air for the open plenum chamber as well as a second fan generating air for the said closed plenum chamber.

11. An air cushion vehicle utilizing essentially a dual pressure air system comprising an open plenum chamber functioning as the main lifting medium for the vehicle, a second substantially enclosed plenum chamber in said vehicle positioned over said open plenum chamber, air outlets in said enclosed chamber arranged to controllably expel air in a direction substantially transverse to the lift direction to maneuver said vehicle, valved passages at the periphery of said open plenum chamber leading from said enclosed plenum chamber directing air from said enclosed chamber into said open plenum chamber to augment the function of said open plenum chamber, a first air generating source for the open plenum chamber, a second air generating source providing air at a relatively higher pressure for said closed plenum chamber and means for controlling the flow of air through said air outlets and air passages.

12. The air cushion vehicle of claim 11 in which means in addition to said annular peripheral passage is employed to optionally vent air from said enclosed plenum chamber into said open plenum chamber to provide auxiliary lift for said vehicle.

13. An air cushion vehicle utilizing essentially a dual pressure air system comprising an open plenum chamber functioning as the main lifting medium for the vehicle, air exhaust outlets on said vehicle to controllably expel relatively high pressure air in a direction substantially transverse to the lift direction to maneuver said vehicle, a valved air ventable passage substantially at the periphery of, and exhausting into, said open plenum chamber, air propelled secondary air generators providing a source of relatively low pressure air for said open plenum chamber, and a power source for said vehicle comprising a gas turbine providing relatively high pressure primary air for said air exhaust outlets and as a source for air exhausting into the open plenum chamber at the periphery thereof and providing air to propel said secondary air generators.

14. The air cushion vehicle of claim 13 in which a pair of gas turbines are arranged so as to provide power for the vehicle individually and, in the alternate, as a unit.

15. An air cushion vehicle generally of catamaran arrangement and utilizing essentially a dual pressure air system comprising an open plenum chamber functioning as the main lifting medium for the vehicle, said plenum chamber comprising fixed side members and a front and rear flap suspended to tilt rearward, a second substantially enclosed plenum chamber in said vehicle positioned over said open plenum chamber arranged to expel air rearward to provide steerage and thrust for said vehicle, a first air generating source for the open plenum chamber, a second air generating source providing air at a relatively higher pressure for said closed plenum chamber.

16. An air cushion vehicle generally of catamaran arrangement and utilizing essentially a dual pressure air system comprising an open plenum chamber functioning as the main lifting medium for the vehicle, said plenum chamber comprising skeg side members terminating in a double knife arrangement at the bottom and a front and rear flap suspended to tilt rearward, a second substantially enclosed plenum chamber in said vehicle positioned over said open plenum chamber arranged to exhaust air pumped therein in a rearward direction to provide thrust for said vehicle, a first air generating source for the open plenum chamber, a second and higher pressure air generating source for said closed plenum chamber and an air foil at the exit of said enclosed plenum chamber for controlling the direction of flow of air from said chamber to provide steerage for the vehicle.

References Cited by the Examiner
UNITED STATES PATENTS

| | | | |
|---|---|---|---|
| 3,045,951 | 7/62 | Freeland | 180—7 |
| 3,066,753 | 12/62 | Hurley | 180—7 |
| 3,078,938 | 2/63 | Bollum | 180—7 |
| 3,090,455 | 5/63 | Crowley et al. | 180—7 |
| 3,101,125 | 8/63 | Deridder | 180—7 |
| 3,118,513 | 1/64 | Cockerell | 180—7 |
| 3,130,939 | 4/64 | Alper et al. | 180—7 |
| 3,137,262 | 6/64 | Tibbetts et al. | 180—7 |

FERGUS S. MIDDLETON, *Primary Examiner.*

A. HARRY LEVY, MILTON BUCHLER, *Examiners.*